(12) United States Patent
Lai et al.

(10) Patent No.: US 8,270,472 B2
(45) Date of Patent: Sep. 18, 2012

(54) METHODS AND APPARATUS FOR ADAPTIVE REFERENCE FILTERING (ARF) OF BI-PREDICTIVE PICTURES IN MULTI-VIEW CODED VIDEO

(75) Inventors: Polin Lai, Plainsboro, NJ (US); Purvin Bibhas Pandit, Franklin Park, NJ (US); Peng Yin, Plainsboro, NJ (US)

(73) Assignee: Thomson Licensing, Boulogne-Billacourt (FR)

( * ) Notice: Subject to any disclaimer, the term of this patent is extended or adjusted under 35 U.S.C. 154(b) by 982 days.

(21) Appl. No.: 12/268,255

(22) Filed: Nov. 10, 2008

(65) Prior Publication Data

US 2009/0129465 A1 May 21, 2009

Related U.S. Application Data

(60) Provisional application No. 60/986,620, filed on Nov. 9, 2007.

(51) Int. Cl.
*H04N 7/12* (2006.01)
(52) U.S. Cl. ......... 375/240.02; 375/240.29; 375/240.12; 375/240.13; 375/240.14; 375/240.15
(58) Field of Classification Search ................ None
See application file for complete search history.

(56) References Cited

U.S. PATENT DOCUMENTS

| | | | | |
|---|---|---|---|---|
| 2010/0150240 A1* | 6/2010 | Wahadaniah et al. | ..... | 375/240.15 |
| 2011/0026588 A1* | 2/2011 | Boyce | ............. | 375/240.12 |
| 2012/0121015 A1* | 5/2012 | Yang | ............. | 375/240.12 |

OTHER PUBLICATIONS

Y. Vatis, B. Edler, D. T. Nguyen, J. Ostermann; Motion- and Aliasing-Compensated Prediction Using a Two-Dimensional Non-Separable Adaptive Wiener Interpolation Filter; year 2005.*
Sven Klomp, Yuri Vatis, Jörn Ostermann; Side Information Interpolation with Sub-Pel Motion Compensation for Wyner-Ziv Decoder; year 2006.*
Yuri Vatis, Joern Ostermann; Adaptive Interpolation Filter for H.264/AVC.*
PoLin Lai et al.; Adaptive reference Filtering for Bidirectional Disparity Compensation with Focus Mismatches; year 2008.*
Thomas Wedi; Adaptive Interpolation Filter for Motion Compensated Prediction; year 2002.*
Y. Vatis, B. Edler, I. Wassermann, D. T. Nguyen and J. Ostermann; Coding of Coefficients of two-dimensional non-separable Adaptive Wiener Interpolation Filter; year 2006.*

(Continued)

*Primary Examiner* — David Y Jung
(74) *Attorney, Agent, or Firm* — Robert D. Shedd; Paul P. Kiel

(57) ABSTRACT

There are provided methods and apparatus for adaptive reference filtering of bi-predictive pictures in multi-view coded video. An apparatus includes an encoder (100) for encoding a current picture as a bi-predictive picture. The encoder (100) performs adaptive filtering of at least one reference picture to respectively obtain at least one filtered reference picture, and bi-predictively codes the current picture using the at least one filtered reference picture. The at least one reference picture is a picture wherein at least one sample thereof is used for inter-prediction either of subsequent to the least one sample being applied to an in-loop filter or in an absence of the at least one sample being applied to an in-loop filter. Reference filter coefficients for the adaptive filtering are determined responsive to at least one of luma values and chroma values of pixels grouped based on at least one of depth and disparity and motion.

22 Claims, 7 Drawing Sheets

OTHER PUBLICATIONS

Jane B. Lawrie and I. David Abrahams; A brief historical perspective of the Wiener-Hopf technique; year 2007.*

PoLin Lai et al.; Adaptive Reference Filtering for MVC with decoder complexity analysis; year 2007.*

* cited by examiner

METHODS AND APPARATUS FOR ADAPTIVE REFERENCE FILTERING (ARF) OF BI-PREDICTIVE PICTURES IN MULTI-VIEW CODED VIDEO

CROSS-REFERENCE TO RELATED APPLICATIONS

This application claims the benefit of U.S. Provisional Application Ser. No. 60/986,620, filed 9 Nov. 2007, which is incorporated by reference herein in its entirety.

TECHNICAL FIELD

The present principles relate generally to video encoding and decoding and, more particularly, to methods and apparatus for adaptive reference filtering (ARF) for bi-predictive pictures in multi-view coded video.

BACKGROUND

In state-of-art video coding schemes, block-based motion compensated prediction (MCP) is used to exploit temporal redundancy. For inter-view coding in a multi-view video coding (MVC) scenario, a block matching procedure can also be applied to perform disparity compensated prediction (DCP), thus exploiting inter-view redundancy. These techniques achieve high coding efficiency for translational displacement. However, there exist mismatches in the video content that are beyond translational displacement such as, for example, focus changes, motion blur in monoscopic video, and illumination and focus mismatches across different views in multi-video video coding.

In the context of video coding, adaptive filtering approaches have previously been proposed to improve coding efficiency. For example, subpel motion compensation has been proposed. Such proposals involve an adaptive interpolation filtering (AIF) method, which introduces two-dimensional (2D) non-separable filters as compared to the interpolation filters of the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard"). In the AIF method, for encoding B-frames, one set of interpolation filters are estimated for different subpel positions, and then applied to references in both List 0 and List 1. Hence, the AIF method is deficient in that it does not separately consider the possible different types of mismatches from List 0 and from List 1. That is, estimating and/or applying more than one set of filters to different lists is not enabled in the AIF method.

SUMMARY

These and other drawbacks and disadvantages of the prior art are addressed by the present principles, which are directed to methods and apparatus for adaptive reference filtering (ARF) for bi-predictive pictures in multi-view coded video.

According to an aspect of the present principles, there is provided an apparatus. The apparatus includes an encoder for encoding a current picture as a bi-predictive picture. The encoder performs adaptive filtering of at least one reference picture to respectively obtain at least one filtered reference picture, and bi-predictively codes the current picture using the at least one filtered reference picture. The at least one reference picture is a picture wherein at least one sample thereof is used for inter-prediction either of subsequent to the least one sample being applied to an in-loop filter or in an absence of the at least one sample being applied to an in-loop filter. Reference filter coefficients for the adaptive filtering are determined responsive to at least one of luma values and chroma values of pixels grouped based on at least one of depth and disparity and motion.

According to another aspect of the present principles, there is provided a method. The method includes encoding a current picture as a bi-predictive picture. The encoding step includes performing adaptive filtering of at least one reference picture to respectively obtain at least one filtered reference picture, and bi-predictively coding the current picture using the at least one filtered reference picture. The at least one reference picture is a picture wherein at least one sample thereof is used for inter-prediction either of subsequent to the least one sample being applied to an in-loop filter or in an absence of the at least one sample being applied to an in-loop filter. Reference filter coefficients for the adaptive filtering are determined responsive to at least one of luma values and chroma values of pixels grouped based on at least one of depth and disparity and motion.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 8 is a flow diagram for an exemplary method for video decoding using reference filtering, in accordance with an embodiment of the present principles;

DETAILED DESCRIPTION

Figure 1:
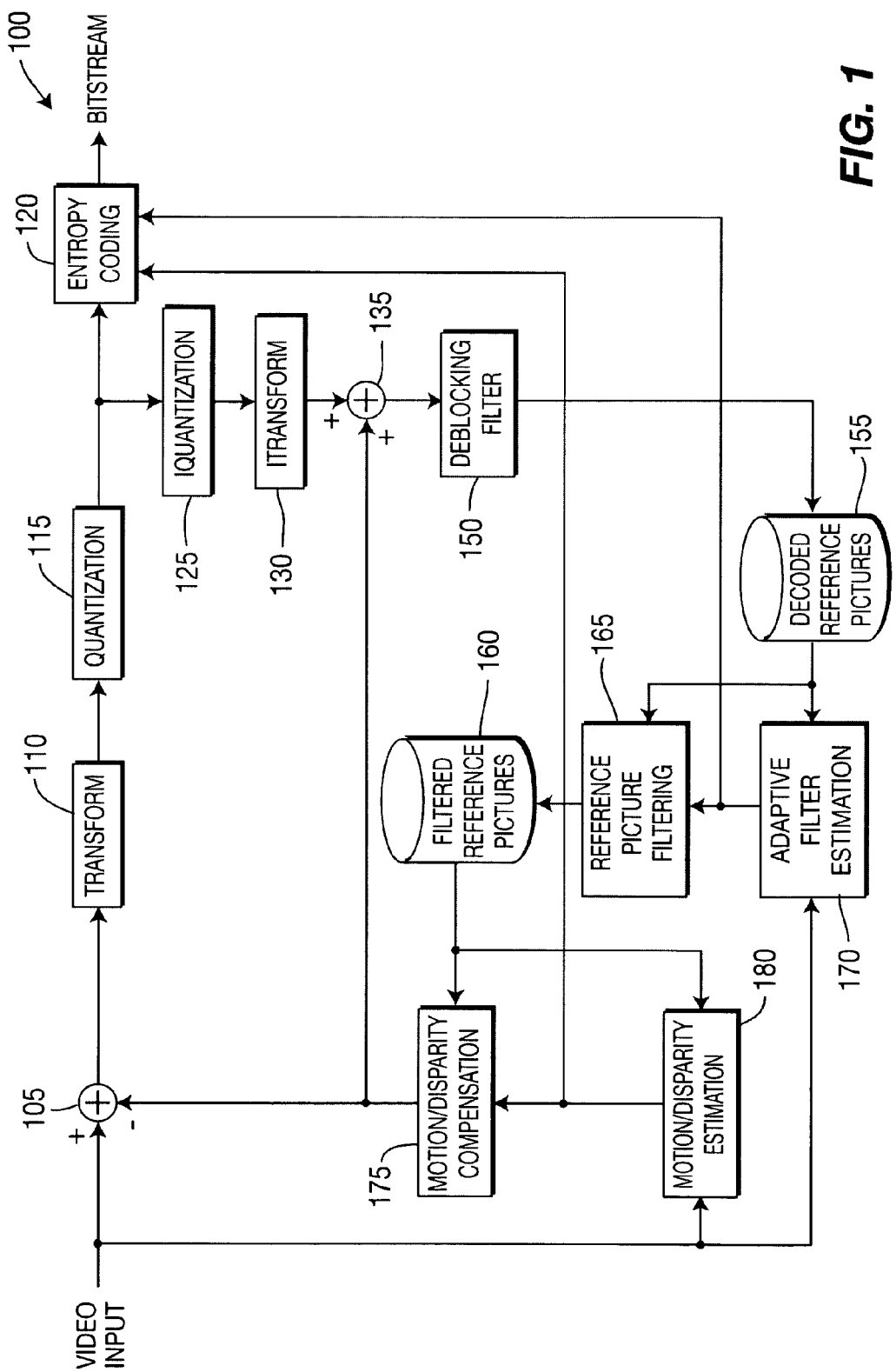
FIG. 1 is a block diagram for an exemplary Multi-view Video Coding (MVC) encoder with adaptive reference filtering, in accordance with an embodiment of the present principles.

The present principles are directed to methods and apparatus for adaptive reference filtering (ARF) for bi-predictive pictures in multi-view coded video.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the multi-view video coding extension of the MPEG-4 AVC standard, the present principles are not limited to solely this extension and/or this standard and, thus, may be utilized with respect to other video coding standards, recommendations, and extensions thereof, while maintaining the spirit of the present principles.

Multi-view video coding (MVC) is the compression framework for the encoding of multi-view sequences. A Multi-view Video Coding (MVC) sequence is a set of two or more video sequences that capture the same scene from a different view point.

As used herein, the term "reference picture" refers to a picture from which at least one sample is obtained for use for inter-prediction after (i.e., subsequent to) the at least one sample is applied to an in-loop filter (such as, for example, a deblocking filter) or when no such in-loop filter is applied at all.

Turning to FIG. 1, an exemplary Multi-view Video Coding (MVC) encoder with adaptive reference filtering is indicated generally by the reference numeral 100. The encoder 100 includes a combiner 105 having an output connected in signal communication with an input of a transformer 110. An output of the transformer 110 is connected in signal communication with an input of quantizer 115. An output of the quantizer 115 is connected in signal communication with a first input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 135. An output of the combiner 135 is connected in signal communication with an input of a deblocking filter 150. An output of the deblocking filter 150 is connected in signal communication with an input of a decoded reference pictures store 155. An output of the decoded reference pictures store 155 is connected in signal communication with a first input of an adaptive filter estimator 170 and a first input of a reference picture filter 165. An output of the adaptive filter estimator 170 is connected in signal communication with a second input of the reference picture filter 165 and a third input of the entropy coder 120. An output of the reference picture filter 165 is connected in signal communication with an input of a filtered reference pictures store 160. An output of the filtered reference pictures store 160 is connected in signal communication with a first input of a motion/disparity compensator 175 and a first input of a motion/disparity estimator 180. An output of the motion/disparity estimator 180 is connected in signal communication with a second input of the motion/disparity compensator and a second input of the entropy coder 120. An output of the motion/disparity compensator 175 is connected in signal communication with an inverting input of the combiner 105 and a non-inverting input of the combiner 135. A non-inverting input of the combiner 105, a second input of the motion/disparity estimator 180, and a second input of the adaptive filter estimator 170 are available as inputs to the encoder 100. An output of the entropy coder 120 is available as an output to the encoder 100.

Figure 2:
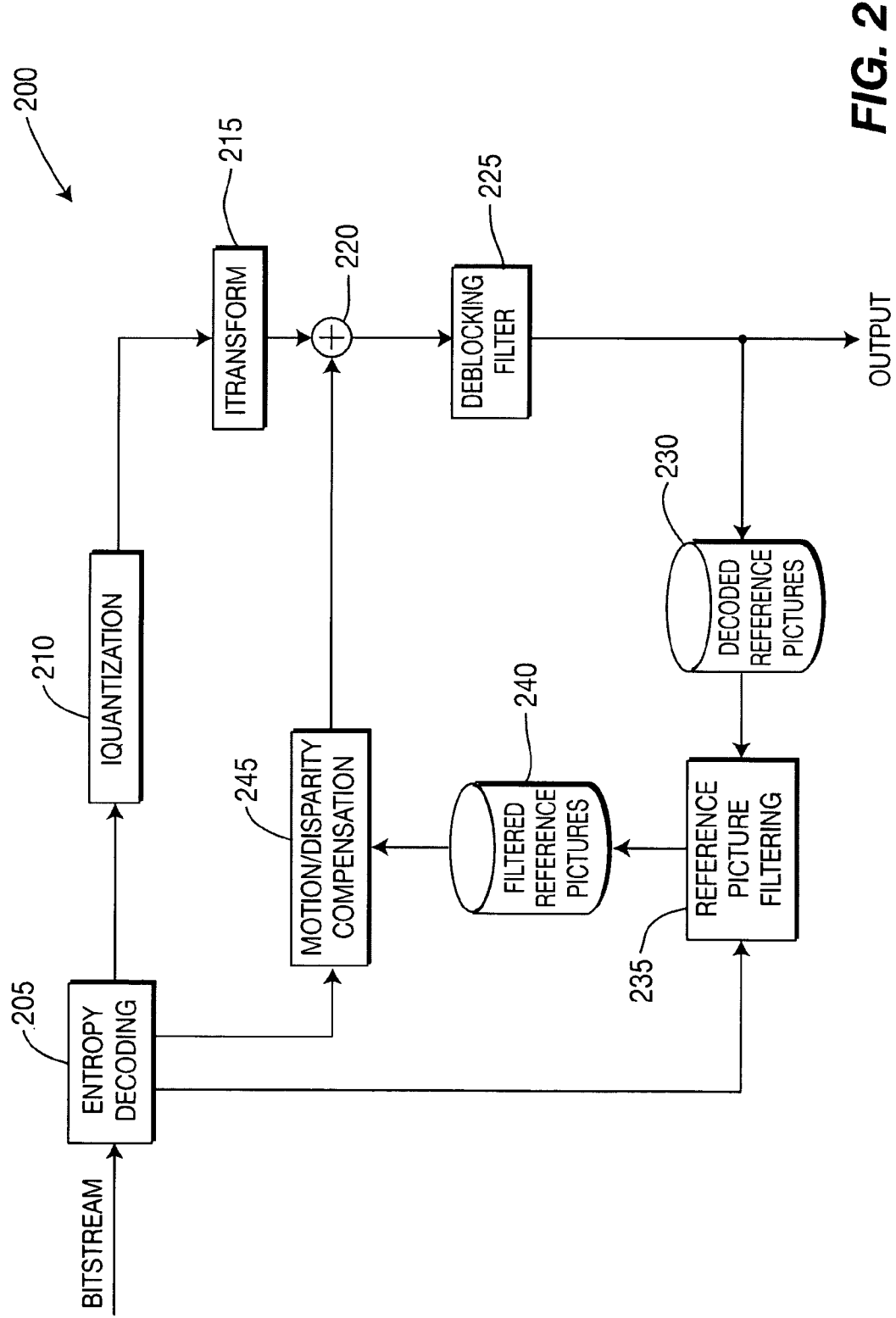
FIG. 2 is a block diagram for an exemplary Multi-view Video Coding (MVC) decoder with adaptive reference filtering, in accordance with an embodiment of the present principles.

Turning to FIG. 2, an exemplary Multi-view Video Coding (MVC) decoder with adaptive reference filtering is indicated generally by the reference numeral 200. The decoder 200 includes an entropy decoder 205 having a first output connected in signal communication with an input of an inverse quantizer 210. An output of the inverse quantizer 210 is connected in signal communication with an input of an inverse transformer 215. An output of the inverse transformer 215 is connected in signal communication with a first non-inverting input of a combiner 220. An output of the combiner 220 is connected in signal communication with an input of a deblocking filter 225. An output of the deblocking filter 225 is connected in signal communication with an input of a decoded reference pictures store 230. An output of the decoded reference pictures store 230 is connected in signal communication with a first input of a reference picture filter 235. An output of the reference picture filter 235 is connected in signal communication with an input of a filtered reference pictures store 240. An output of the filtered reference pictures store 240 is connected in signal communication with a first input of a motion/disparity compensator 245. An output of the motion/disparity compensator 245 is connected with a second non-inverting input of the combiner 220. A second output of the entropy decoder 205 is connected in signal communication with a second input of the reference picture filter 235. A third output of the entropy decoder 205 is connected in signal communication with a second input of the motion/disparity compensator 245. An input of the entropy decoder 205 is available as an input of the decoder 200. The output of the deblocking filter 225 is available as an output of the decoder 200.

As noted above, the present principles are directed to methods and apparatus for adaptive reference filtering (ARF) for bi-predictive pictures in multi-view coded video.

Previously, to compensate for localized mismatches, reference-filtering methods have been proposed. In accordance with these reference-filtering methods, the encoding method and syntax were designed for P-frames (with a reference only from one reference list, List 0). After initial displacement estimation, the proposed methods estimate parameters to partition a current frame into regions that suffer from different types of mismatches as compared to the reference frames. For example, in multi-view video coding inter-view prediction, the block-wise disparity vectors are exploited to partition the current frame into different depth levels in the above mentioned reference-filtering methods.

We see the benefit (although more complex) of enabling this for B-frames (bi-prediction) as well, but we have to develop a new frame partition process to do this. An embodiment of our new frame partition process allows for incorporated predictors from different prediction directions (such as left/right neighboring views in inter-view prediction). Furthermore, even for a given region, an embodiment of our new frame partition process also considers different mismatches with respect to the corresponding regions in different reference frames from the two lists. In an embodiment, one or more sets of filters are adaptively designed for one or more frames from different reference lists. The designed filters are applied to the corresponding reference lists to compensate for mismatches.

Thus, in accordance with the present principles, we consider compensating non-translational mismatches for frames that are encoded with bi-prediction (B-frames). To encode these B-frames, predictive coding is performed by using reference frames from two reference lists (List 0 and List 1), which include previously encoded frames. For example, in monoscopic video, List 0 and List 1 may include earlier frames or future frames in temporal display order. In multi-view video coding inter-view prediction, List 0 and List 1 may include frames from other views in different directions, such as left/right neighboring views. In the presence of non-translational mismatches such as focus changes, a B-frame to be encoded may suffer from different types of mismatches (e.g., blurring/sharpening) with respect to the reference frames from List 0 and List 1. Furthermore, the mismatches can be also localized as follows: different portions of the current B-frame can exhibit different mismatches as compared to the corresponding regions in the references in List 0 and List 1. For example, in multi-view video coding inter-view prediction, a foreground object in View 1 may be blurred as compared to the same object appearing in View 0, with the foreground object in View 1 being more in focus (sharp) as compared to its image in View 2.

To tackle these mismatches, we disclose and describe methods and apparatus for adaptive reference filtering (ARF) for bi-prediction (B-frames). Based on the estimated changes between the current B-frame and its references from List 0 and List 1, the proposed coding schemes estimate a set(s) of filters to compensate for the mismatches. The designed filters will then be applied to the corresponding reference lists to generate better-matched references that achieve higher coding efficiency.

For video coding utilizing bi-prediction, frames may suffer from different types of mismatches with respect to the reference frames from different reference lists. The proposed frameworks can be applied to both motion compensated prediction in regular monoscopic video coding, and to disparity compensated prediction in multi-view video coding (MVC). In particular, we demonstrate examples which apply the proposed scheme to inter-view prediction in multi-view video coding, where the prediction direction and disparity information are used to determine the number of sets of filters and the number of filters in each set. Of course, given the teachings of the present principles provided herein, one of ordinary skill in this and related arts will readily understand how such teachings are applied to monoscopic video coding, while maintaining the spirit of the present principles.

We first describe how to estimate filters for bi-prediction. Then we propose new syntax to cover two reference lists, List 0 and List 1. In an embodiment, we propose a two-pass coding scheme as follows: after initial displacement estimation (motion and/or disparity), the encoder estimates filters based on the mismatches between the current frame and the reference frames. For bi-prediction, the reference frames come from two reference lists, List 0 and List 1. Depending on the exhibited mismatches and application scenarios, one or more sets of filters are calculated by minimizing residue energy (e.g., mean-squared error). The obtained filters will then be applied to the corresponding reference lists to generate filtered reference frames to compensate for mismatches. One exemplary difference in the approaches in accordance with the present principles and the prior art is that it is possible to estimate and/or apply more than one set of filters in order to address mismatches in frames from List 0 and List 1. Besides partitioning frames into regions with different types of mismatches (for example, blurring and/or sharpening in different depth levels), the prediction direction from which the predictors are obtained is also considered.

Figure 4:
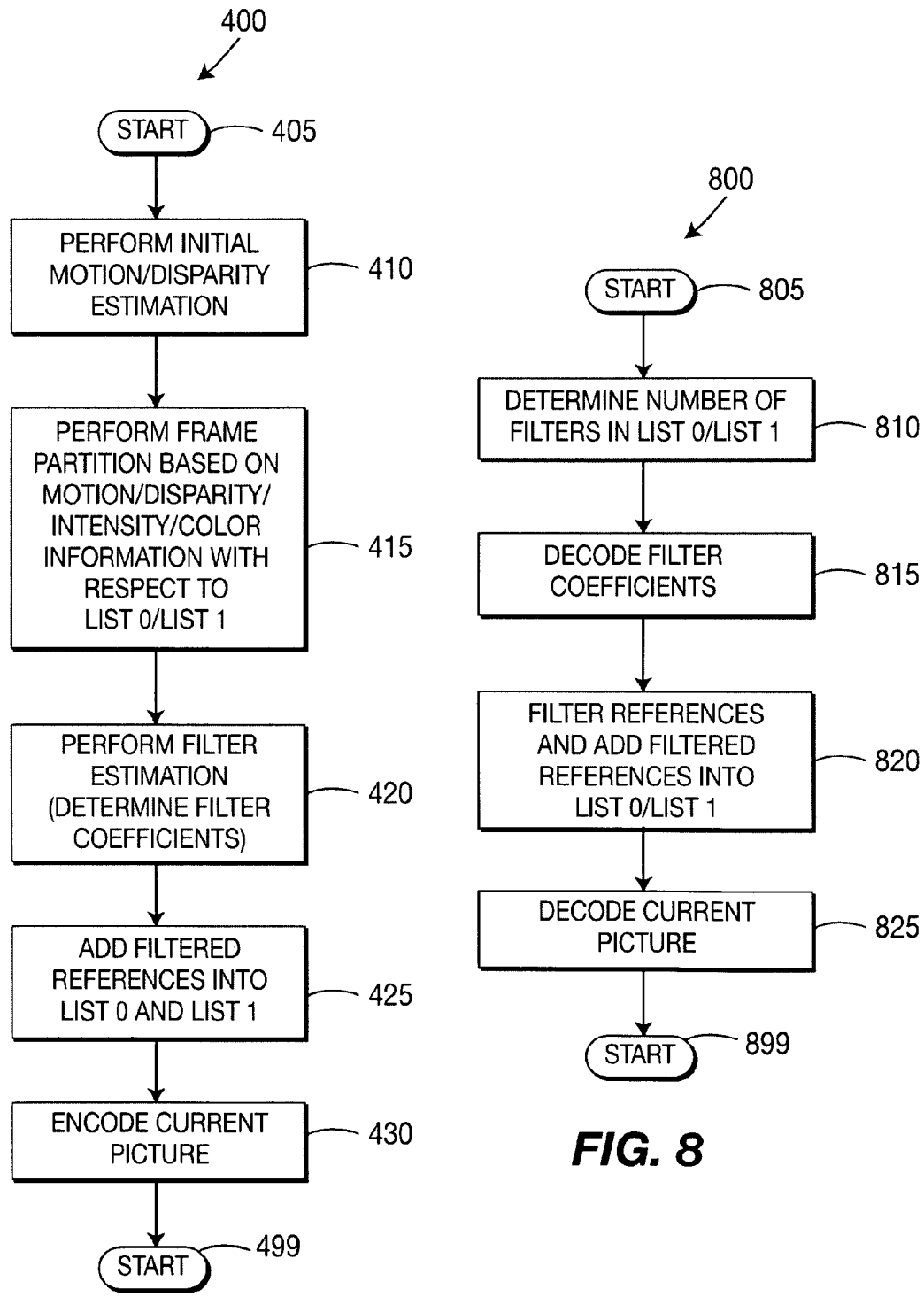
FIG. 4 is a flow diagram for an exemplary top-level method for video encoding using reference filtering, in accordance with an embodiment of the present principles.

Turning to FIG. 4, an exemplary method for video encoding using adaptive reference filtering is indicated generally by the reference numeral 400. The method 400 may be considered to show a more general level of detail with respect to video encoding than shown with respect to the methods 500, 600, and 700 described below with respect to FIGS. 5, 6, and 7.

The method 400 includes a start block 405 that passes control to a function block 410. The function block 410 performs an initial motion/disparity estimation, and passes control to a function block 415. The function block 415 performs a frame partition based on motion/disparity/intensity/color information with respect to List 0/List 1, and passes control to a function block 420. The function block 420 performs filter estimation (including determining filter coefficients), and passes control to a function block 425. The function block 425 adds filtered references into List 0 and List 1, and passes control to a function block 430. The function block 430 encodes the current picture, and passes control to an end block 499.

In the following, we will describe in detail some embodiments of the proposed adaptive reference filtering for B-frames. We will use inter-view prediction in multi-view video coding as the basis of the examples set forth herein to demonstrate the design. Given the teachings of the present principles provided herein, one of ordinary skill in this and related arts will readily appreciate that the present principles can be implemented in similar procedures that can also be applied to monoscopic video coding. Herein, we first describe inter-view prediction in multi-view video coding with bi-prediction, in accordance with the present principles.
Example of "Inter-View Prediction in Multi-View Video Coding"

Figure 3:
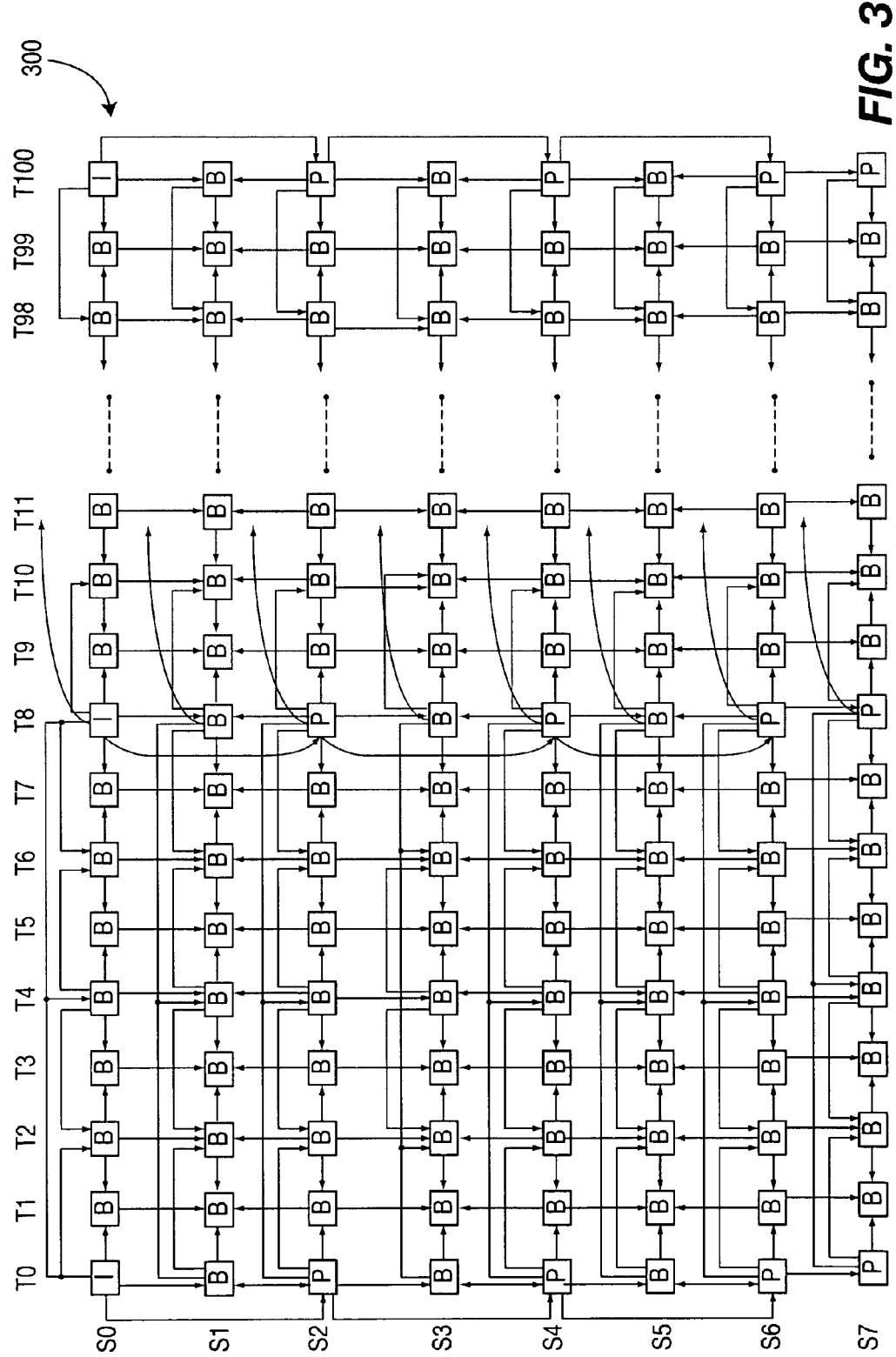
FIG. 3 is a diagram for an inter-view-temporal prediction structure based on the MPEG-4 AVC standard, using hierarchical B pictures, in accordance with an embodiment of the present principles.

Multi-view video coding considers encoding video data captured simultaneously by multiple cameras, which are often referred to as "views". Inter-view prediction, as compared to temporal prediction in monoscopic video, refers to encoding a frame using frames from other views as references. For example, if there are 7 views V0~V6, at a given timestamp, we can encode frames from these views using an IBPBPBP structure. Thus, a frame from view V2 (P) is encoded with a frame from view V0 as a reference, while a frame from view V1 (B) is encoded using bi-prediction, with V0 in its List 0 and V2 in its List 1. FIG. 3 is a diagram for an inter-view-temporal prediction structure based on the MPEG-4 AVC standard, using hierarchical B pictures, in accordance with an embodiment of the present principles.
ARF for B-Frames—Encoder Embodiment I:
(3 Sets of Filters Based on Prediction Directions and Mismatches)

To encode a frame in view V1 as in the example above, the initial disparity estimation is performed using bi-prediction. In video coding such as H.264/AVC, when bi-prediction is enabled, blocks in the current frame can select to use predictors from references in List 0 (V0 in this example), or from references in List 1 (V2), or use the average values of two predictors from references in List 0 and List 1. The decision may be based on, for example, rate-distortion (RD) optimization.

To model mismatches from different references, in this embodiment, after the initial disparity estimation with bi-prediction, we classify blocks in the current frame S into the following 3 groups: $S_{L0}$ refers to blocks that select predictors from view V0 (List 0); $S_{L1}$ refers to blocks that select predictors from view V2 (List 1); and $S_{Bi}$ refers to blocks that select the average predictor from view V0 and view V2. If the inter-view mismatches appear to be frame-wise (as compared to localized in different regions within a frame), we can design one filter for each class, which minimizes the residue energy over all blocks in a given class. For example, the current frame in view V1 is blurred as compared to view V0, but is sharpened as compared to view V2. The estimated filter $h_{L0}$ for the class $S_{L0}$ would demonstrate low-pass characteristic in order to match the frame from view V1. On the other hand, filter $h_{L1}$ estimated for blocks selecting view V2 ($S_{L1}$) would have some enhancement capability. The third filter $h_{Bi}$, which is estimated for blocks using the average predictor from view V0 and view V2 ($S_{Bi}$), achieves minimized mean-squared error when applied to the averaged predictor from view V0 and view V2 in inter-view prediction.

Blocks in $S_{L0}$: $\min_{(h)} \Sigma(x,y)\{S(x,y)-h_{L0}*R_{L0}(x+dx_{L0},y+dy_{L0})\}^2$ Blocks in $S_{L1}$: $\min_{(h)} \Sigma(x,y)\{S(x,y)-h_{L1}*R_{L0}(x+dx_{L0},y+dy_{L0})\}^2$ Blocks in $S_{Bi}$: $\min_{(h)} \Sigma(x,y)\{S(x,y)-h_{Bi}*(\frac{1}{2})[R_{L0}(x+dx_{L0},y+dy_{L0})+R_{L1}(x+dx_{L1},y+dy_{L1})]\}^2$ In the immediately preceding equations, * denote the convolution operation, $R_{L0}$ is the reference in List 0, $R_{L1}$ is the reference in List 1, (x,y) is the pixel position within a frame, and $(dx_{L0}, dy_{L0})$ $(dx_{L1}, dy_{L1})$ are the corresponding disparity vectors obtained from the initial disparity estimation.

As described above, our approach can address different types of mismatches exhibited in the references from List 0 and List 1 by estimating filters dedicated for the target references. For the current frame from view V1, the estimated filter $h_{L0}$ will be applied to view V0 in its List 0, filter $h_{L1}$ will be applied to view V2 in its List 1, and filter $h_{Bi}$ will be applied to both lists. The final disparity compensated prediction will then be performed with new filtered references in List 0 and List 1 to achieve high coding efficiency.

If the mismatches in different views are localized, our approach can be extended to design multiple filters for each group. For a multi-view video coding scenario in which the mismatches are scene-depth dependent, $S_{L0}$, $S_{L1}$, and $S_{Bi}$ can each be further partitioned into multiple depth-levels by exploiting the block-wise disparity vectors. For blocks in $S_{L0}$, their disparity vectors all point to a frame from V0. The present principles are not limited to any particular classification method to achieve depth-related partition and, thus, any classification method can be used for the same, while maintaining the spirit of the present principles. The same method also applies to blocks in $S_{L1}$. As for blocks in $S_{Bi}$, each block is associated with two disparity vectors, with one of the disparity vectors pointing to view V0 and the other disparity vector pointing to view V2. The classification can be modified to take both as input features, or simply take one of them as an input feature. After this further classification, the resulting regions $S_{L0,0}$ $S_{L0,1}$ $S_{L0,2}$ ... $S_{L1,0}$ $S_{L1,1}$ $S_{L1,2}$ ... and $S_{Bi,0}$ $S_{Bi,1}$ $S_{Bi,2}$ ... will be involved in estimating 3 filters sets: $H_{L0}=\{h_{L0,0}\ h_{L0,1}\ h_{L0,2} \ldots\}$; $H_{L1}=\{h_{L1,0}\ h_{L1,1}\ h_{L1,2} \ldots\}$; and $H_{Bi}=\{h_{Bi,0}\ h_{Bi,1}\ h_{Bi,2} \ldots\}$. For each region, the filter estimation also follows the equations listed above. To generate filtered references, the filters in $H_{L0}$ are applied to the frame in L0, the filters in $H_{L1}$ are applied to the frame in L1, and the filters in $H_{Bi}$ are applied to the frames in both lists.

Figure 5:
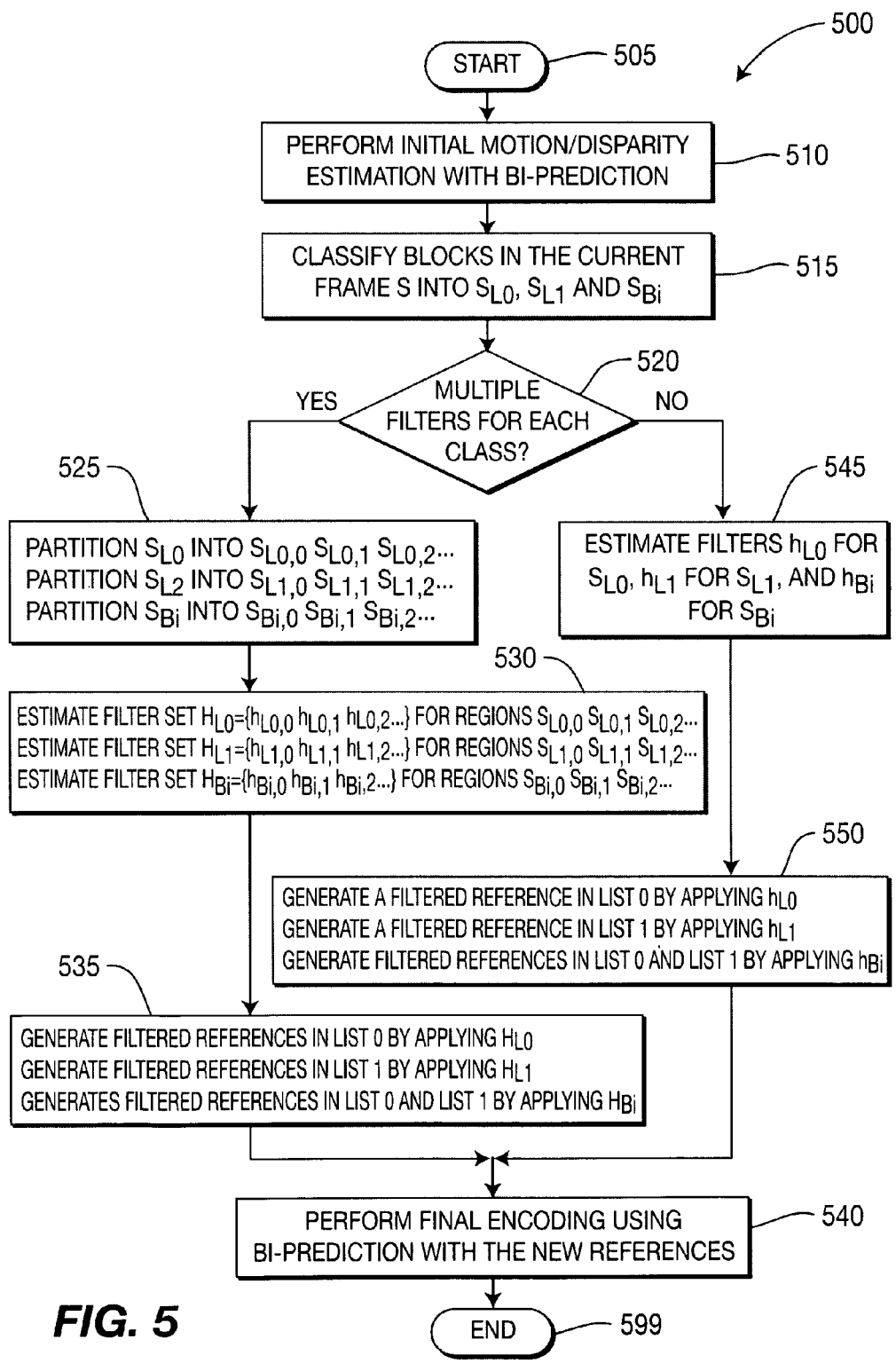
FIG. 5 is a flow diagram for an exemplary method for video encoding using adaptive reference filtering, in accordance with an embodiment of the present principles.

Turning to FIG. 5, an exemplary method for video encoding using adaptive reference filtering is indicated generally by the reference numeral 500.

The method 500 includes a start block 505 that passes control to a function block 510. The function block 510 performs initial motion/disparity estimation with bi-prediction, and passes control to a function block 515. The function block 515 classifies blocks in the current frame S into $S_{L0}$, $S_{L1}$, and $S_{Bi}$, and passes control to a decision block 520. The decision block 520 determines whether or not multiple filters are to be created for each class. If so, then control is passed to a function block 525. Otherwise, control is passed to a function block 545.

The function block 525 partitions $S_{L0}$ into $S_{L0,0}$ $S_{L0,1}$ $S_{L0,2}$..., partitions $S_{L2}$ into $S_{L1,0}$ $S_{L1,1}$ $S_{L1,2}$..., partitions $S_{Bi}$ into $S_{Bi,0}$ $S_{Bi,1}$ $S_{Bi,2}$..., and passes control to a function block 530. The function block 530 estimates filter set $H_{L0} = \{h_{L0,0}\ h_{L0,1}\ h_{L0,2}\ldots\}$ for regions $S_{L0,0}$ $S_{L0,1}$ $S_{L0,2}$..., estimates filter set $H_{L1} = \{h_{L1,0}\ h_{L1,1}\ h_{L1,2}\ \ldots\ \}$ for regions $S_{L1,0}$ $S_{L1,1}$ $S_{L1,2}$..., estimates filter set $H_{Bi} = \{h_{Bi,0}\ h_{Bi,1}\ h_{Bi,2}\ \ldots\ \}$ for regions $S_{Bi,0}$ $S_{Bi,1}$ $S_{Bi,2}$..., and passes control to a function block 535. The function block 535 generates filtered references in List 0 by applying $H_{L0}$, generates filtered references in List 1 by applying $H_{L1}$, generates filtered references in List 0 and 1 by applying $H_{Bi}$, and passes control to a function block 540.

The function block 540 performs a final encoding using bi-prediction with the new references, and passes control to an end block 599.

The function block 545 estimates filters $h_{L0}$ for $S_{L0}$, $h_{L1}$ for $S_{L1}$, and $h_{Bi}$ for $S_{Bi}$, and passes control to a function block 550. The function block 550 generates a filtered reference in List 0 by applying $h_{L0}$, generates a filtered reference in List 1 by applying $h_{L1}$, generates filtered references in List 0 and List 1 by applying $h_{Bi}$, and passes control to the function block 540.

ARF for B-Frames—Encoder Embodiment II:
(2 Sets of Filters Based on Prediction Directions and Mismatches)

In this embodiment, instead of designing 3 sets of filters as in Embodiment I, we will design two sets of filters, one for List 0 and one for List 1.

After the initial disparity estimation, once again the blocks in the current frame S are classified into the following 3 groups $S_{L0}$, $S_{L1}$, and $S_{Bi}$, as described in Embodiment I. For a block in $S_{Bi}$, its predictor is the average of two corresponding blocks, one from a frame in List 0 and one from a frame in List 1. In the current state of the art video coding schemes, both predictors are obtained via rate-distortion based search algorithms (independent search for each predictor from List 0 and List 1, or iterative search between the two). As a result, for blocks selecting bi-prediction, although the final predictor is formed by averaging the two predictors from List 0 and List 1, each predictor itself provides a good block matching in the corresponding reference list. Thus, we consider separately the predictors from List 0 and from List 1 for blocks in $S_{Bi}$. Two sets of filters can be designed in the following manner: $S_{L0}$, $S_{Bi}$ and their corresponding predictors from List 0 will be used to estimate filter set $H_{L0}$ for List 0; while $S_{L1}$, $S_{Bi}$ and their predictors from List 1 will be used to estimate filter set $H_{L1}$ for List 1. If the mismatches appear to be frame-wise (as compared to localized in different regions within a frame), then only one filter is estimated for each set, which can be summarized as follows:

Blocks in $S_{L0}$ and $S_{Bi}$: $\min_{(h)} \Sigma(x,y)\{S(x,y) - h_{L0} * R_{L0}(x + dx_{L0}, y + dy_{L0})\}^2$ Blocks in $S_{L1}$ and $S_{Bi}$: $\min_{(h)} \Sigma(x,y)\{S(x,y) - h_{L1} * R_{L1}(x + dx_{L1}, y + dy_{L1})\}^2$ For localized mismatches, the two sets $\{S_{L0}, S_{Bi}\}$ and $\{S_{L1}, S_{Bi}\}$ can each be partitioned into multiple regions that suffer from different types of mismatches. In multi-view video coding (MVC) inter-view prediction, blocks in the first set $\{S_{L0}, S_{Bi}\}$ can be partitioned into multiple depth levels $S_{L0,0}$ $S_{L0,1}$ $S_{L0,2}$..., by classifying their disparity vectors that point to List 0, i.e., $(dx_{L0}, dy_{L0})$. Similarly, blocks in the set $\{S_{L1}, S_{Bi}\}$ can be partitioned into depth levels $S_{L1,0}$ $S_{L1,1}$ $S_{L1,2}$..., based on $(dx_{L1}, dy_{L1})$. Note that blocks in $S_{Bi}$ have both a disparity vector to List 0 and a disparity vector to List 1, and the classification for each set is performed by taking only one of the disparity vectors as an input feature, depending on which filter set ($H_{L0}$ or $H_{L1}$) you are estimating. The filter estimation can be represented as follows:

Set $H_{L0}$, blocks in $S_{L0,i}$: $\min_{(h)} \Sigma(x,y)\{S(x,y) - h_{L0,i} * R_{L0}(x + dx_{L0}, y + dy_{L0})\}^2$ Set $H_{L1}$, blocks in $S_{L1,i}$: $\min_{(h)} \Sigma(x,y)\{S(x,y) - h_{L1,i} * R_{L1}(x + dx_{L1}, y + dy_{L1})\}^2$ After obtaining the filters, the set $H_{L0} = \{h_{L0,0}\ h_{L0,1}\ h_{L0,2}\ldots\}$ will be applied to List 0 and the set $H_{L1} = \{h_{L1,0}\ h_{L1,1}\ h_{L1,2}\ldots\}$ will be applied to List 1. Final encoding will then be performed with the original and the new references.

Figure 6:
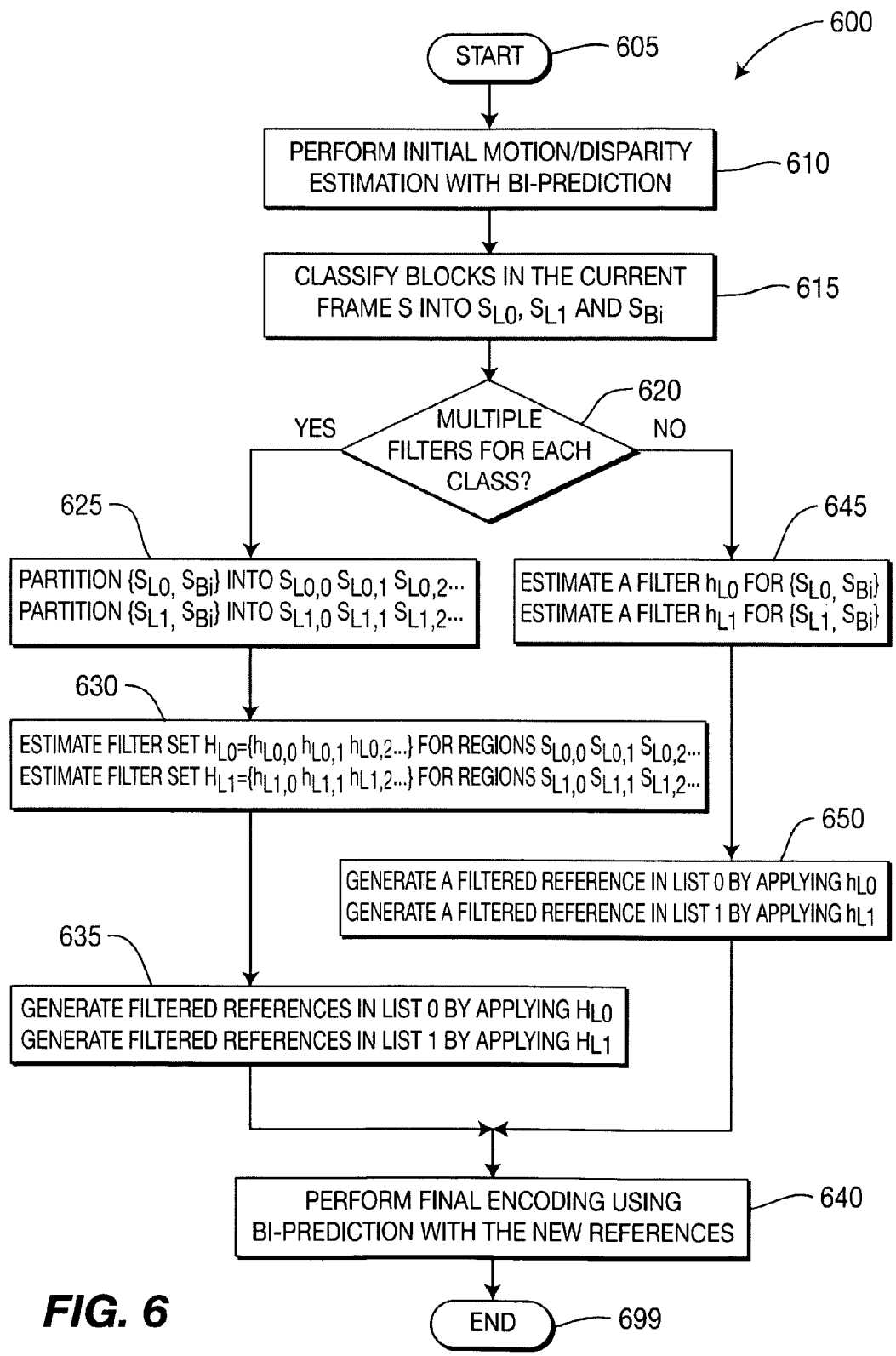
FIG. 6 is a flow diagram for another exemplary method for video encoding using adaptive reference filtering, in accordance with an embodiment of the present principles.

Turning to FIG. 6, another exemplary method for video encoding using adaptive reference filtering is indicated generally by the reference numeral 600.

The method 600 includes a start block 605 that passes control to a function block 610. The function block 610 performs initial motion/disparity estimation with bi-prediction, and passes control to a function block 615. The function block 615 classifies blocks in the current frame S into $S_{L0}$, $S_{L1}$, and $S_{Bi}$, and passes control to a decision block 620. The decision block 620 determines whether or not multiple filters are to be created for each class. If so, then control is passed to a function block 625. Otherwise, control is passed to a function block 645.

The function block 625 partitions $\{S_{L0}, S_{Bi}\}$ into $S_{L0,0}$ $S_{L0,1}$ $S_{L0,2}$..., partitions $\{S_{L1}, S_{Bi}\}$ into $S_{L1,0}$ $S_{L1,1}$ $S_{L1,2}$..., and passes control to a function block 630. The function block 630 estimates filter set $H_{L0} = \{h_{L0,0}\ h_{L0,1}\ h_{L0,2}\}$ for regions $S_{L0,0}$ $S_{L0,1}$ $S_{L0,2}$..., estimates filter set $H_{L1} = \{h_{L1,0}\ h_{L1,1}\ h_{L1,2}\ldots\}$ for regions $S_{L1,0}$ $S_{L1,1}$ $S_{L1,2}$..., and passes control to a function block 635. The function block 635 generates filtered references in List 0 by applying $H_{L0}$, generates filtered references in List 1 by applying $H_{L1}$, and passes control to a function block 640.

The function block 640 performs a final encoding using bi-prediction with the new references, and passes control to an end block 699.

The function block 645 estimates a filter $h_{L0}$ for $\{S_{L0}, S_{Bi}\}$, estimates a filter $h_{L1}$ for $\{S_{L1}, S_{Bi}\}$, and passes control to a function block 650. The function block 650 generates a filtered reference in List 0 by applying $h_{L0}$, generates a filtered reference in List 1 by applying $h_{L1}$, and passes control to the function block 640.

ARF for B-Frames—Encoder Embodiment III:
(Mismatches Exhibited in Only One Reference List)

In the previous two embodiments, we demonstrate methods to estimate more than one set of filters to address mismatches from references in List 0 and List 1. In certain scenarios, mismatches may only be exhibited in references from one of the lists. For example, in multi-view video coding inter-view prediction, with respect to a B-frame, it may be the case that only one of the neighboring cameras includes focus mismatches. As another example, in monoscopic video coding, it may be the case that the focus change appears only after the current B-frame to be encoded, i.e., the previous frames have no focus mismatches. In these cases, estimating/applying filters only to the reference list which exhibited mismatches is a reasonable solution (one-sided mismatches).

To tackle such one-sided mismatches in bi-prediction, the initial disparity estimation and filter calculation are modified. We perform the initial disparity estimation using only one of the reference lists that has mismatches. This is essentially encoding as a P-frame for the initial disparity estimation. If the mismatches are global (frame-wise, as compared to localized in different regions within a frame), only one filter is estimated, which can be summarized as follows:

$$\min_{(h)} \Sigma(x,y)\{S(x,y) - h_{L0} * R_{L0}(x + dx_{LX}, y + dy_{LX})\}^2,$$

where LX denote the reference list (List 0 or List 1) which exhibit mismatches.

For localized mismatches, we then partition the current frame into regions $S_0 S_1 S_2 \ldots$ suffering from different types of mismatches, based on for example disparity vectors, and design filters for each region. This can be summarized as follows:

$$\text{Set } H, \text{ blocks in } S_i: \min_{(h_i)} \Sigma(x,y)\{S(x,y) - h_i * R_{L0}(x + dx_{LX}, y + dy_{LX})\}^2$$

These filters will be applied only to the reference list that was used in the initial disparity estimation (i.e., the list that includes mismatches). Finally, the current B-frame will be encoded with one list having new filtered references and one list remaining unchanged.

Figure 7:
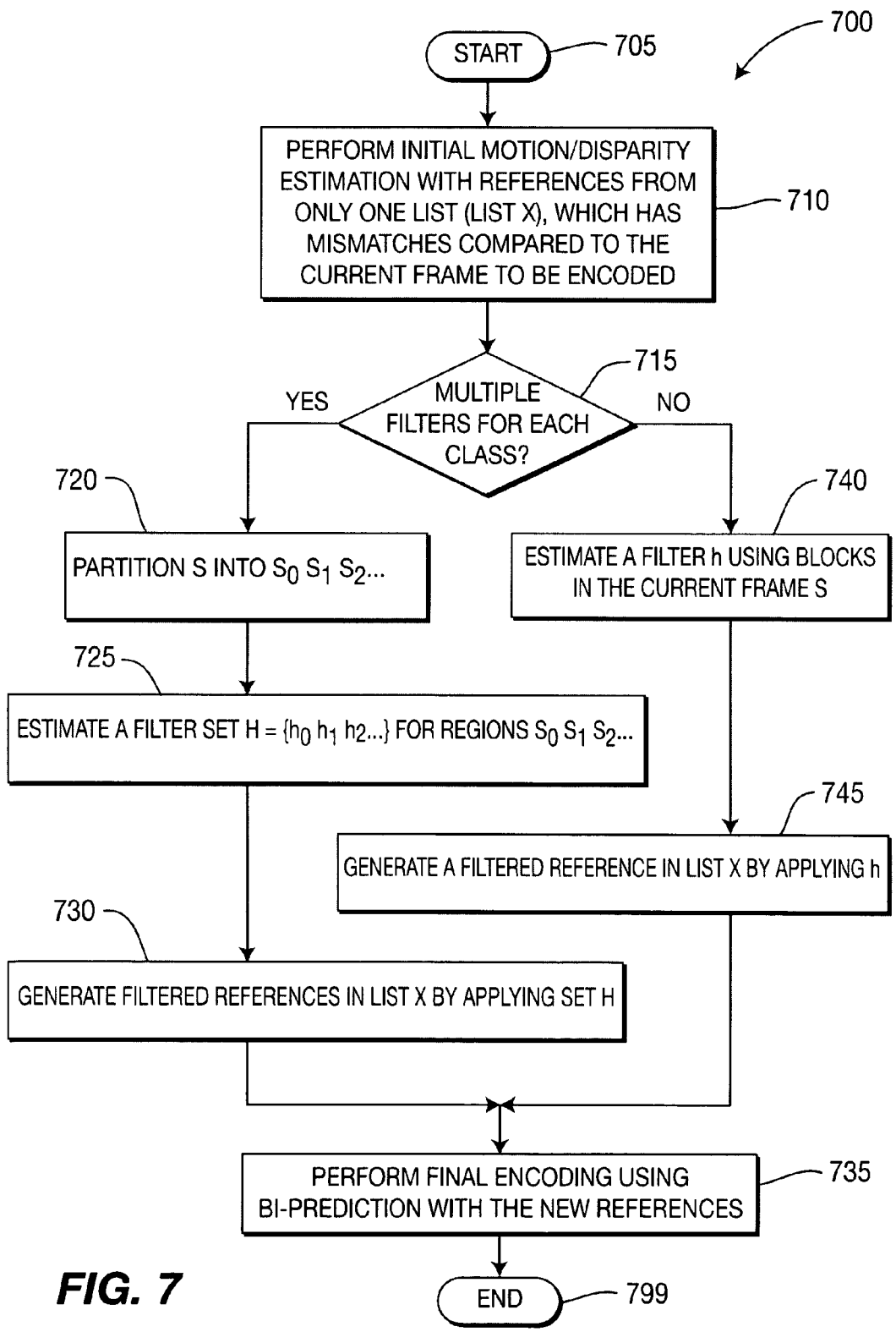
FIG. 7 is a flow diagram for yet another exemplary method for video encoding using adaptive reference filtering, in accordance with an embodiment of the present principles.

Turning to FIG. 7, yet another exemplary method for video encoding using adaptive reference filtering is indicated generally by the reference numeral 700.

The method 700 includes a start block 705 that passes control to a function block 710. The function block 710 performs initial motion/disparity estimation with references from only one list (List X), which has mismatches compared to the current frame to be encoded, and passes control to a decision block 715. The decision block 715 determines whether or not multiple filters are to be created. If so, then control is passed to a function block 720. Otherwise, control is passed to a function block 740.

The function block 720 partitions S into $S_0 S_1 S_2 \ldots$, and passes control to a function block 725. The function block 725 estimates a filter set H={$h_0 h_1 h_2 \ldots$) for regions $S_0 S_1 S_2 \ldots$, and passes control to a function block 730. The function block 730 generates filtered references in List X by applying set H, and passes control to a function block 735.

The function block 735 performs a final encoding using bi-prediction with the new references, and passes control to an end block 799.

The function block 740 estimates a filter h using blocks in the current frame S, and passes control to a function block 745. The function block 745 generates a filtered reference in List X by applying h, and passes control to the function block 735.

Turning to FIG. 8, an exemplary method for video decoding using reference filtering is indicated generally by the reference numeral 800. It is to be appreciated that the method 800 can be used to decode video content encoded using any of the methods 400, 500, 600, and 700.

The method 800 includes a start block 805 that passes control to a function block 810. The function block 810 determines a number of filters in List 0/List 1, and passes control to a function block 815. The function block 815 decodes the filter coefficients, and passes control to a function block 820. The function block 820 filters the references and adds the filtered references into List 0/List 1, and passes control to a function block 825. The function block 825 decodes the current picture, and passes control to an end block 899.

It is to be noted that although in the encoding embodiments listed above, we used inter-view prediction as examples, they can also be applied to temporal predictions in monoscopic video or multi-view video coding (MVC). Blocks in the current frame S can still be divided into groups $S_{L0}, S_{L1}, S_{Bi}$. For further partitioning in order to compensate for localized mismatches, features such as motion vectors, pixels values (luminance, chroma), and block-wise parametric filter coefficients can be considered to identity image regions that suffer from different types of mismatches.

Transmission and Decoding:

Filtered references frames in List 0 and List 1 can be stored using the reference list reordering process in the MPEG-4 AVC Standard. Filter coefficients are quantized then encoded and transmitted as high level syntax. For multi-view applications, the filter coefficients can even be differentially encoded for higher coding efficiency. Given two views from a multi-view system, the inherent mismatch in these two cameras should not change rapidly in time. We can code the coefficients of at current time stamp differentially with the coefficients at a previous time stamp.

There is new syntax introduced by our ARF for bi-prediction in according with the present principles. We have to indicate which filters are for List 0, which are for List 1, and possibly which are designed for both (in Embodiment I). This can be achieved by transmitting filter sets sequentially (e.g., $H_{L0}$, followed by $H_{L1}$, followed by $H_{Bi}$) in the high level syntax, and transmitting the numbers of filters in each set. This will allow the decoder will know how many filters it should anticipate, and filter the corresponding reference lists with the correct filters. Examples will now be provided for each of the above described embodiments.

Example for Embodiment I, with 3 Filters in $H_{L0}$, 2 Filters in $H_{L1}$, and 2 Filters in $H_{Bi}$:

Transmit syntax 7, 3, 2, and then the filter coefficients.

At the decoder, there is a total of seven filters, where the first three filters are for List 0, then two filters are for List 1, and two for both lists (7−3−2=2).

Example for Embodiment II, with 3 Filters in $H_{L0}$, and 2 Filters in $H_{L1}$:

Transmit syntax 5, 3, 2, and then the filter coefficients.

At the decoder, there is a total of five filters, where the first three filters are for List 0, then two are for List 1, and there is no filter(s) for both lists (5−3−2=0).

Example for Embodiment III, with 0 Filters in $H_{L0}$, 3 Filters in $H_{L1}$:

Transmit syntax 3, 0, 3 and then the filter coefficients.

At the decoder, there is a total of 3 filters, where none of the filters are for List 0, three of the filters are for List 1, and none of the filters are for both lists.

In another example, we can send filters separate for each list. TABLE 1 below illustrates the corresponding syntax. The decoding process is also described below.

The semantics for the new syntax elements are as follows:
arf_flag equal to 1 specifies that adaptive reference filtering is enabled for the current slice. arf_flag equal to 0 indicates that adaptive reference filtering is not enabled for the current slice.
arf_l0_flag equal to 1 specifies that filter coefficients of List 0 prediction are present. arf_l0_flag equal to 0 specifies that filter coefficients of List 0 prediction are not present.
arf_l1_flag equal to 1 specifies that filter coefficients of List 1 prediction are present. arf_l1_flag equal to 0 specifies that filter coefficients of List 1 prediction are not present.
coeff_l0[k][j] specifies the $j^{th}$ filter coefficient for the $k^{th}$ filter for LIST_0.
coeff_l1[k][j] specifies the $j^{th}$ filter coefficient for the $k^{th}$ filter for LIST_1.

For the unfiltered references, the corresponding coefficients are as follows: coeff_lx[k][0]=coeff_lx[k][1]=coeff_lx[k][2]=0; and coeff_lx[k][3]=1.

TABLE 1 illustrates syntax for a slice header, in accordance with an embodiment of the present principles.

TABLE 1

| slice_header( ) { | C | Descriptor |
|---|---|---|
|   first_mb_in_slice | 2 | ue(v) |
|   slice_type | 2 | ue(v) |
|   ic_enable | 2 | u(1) |
|   if ( anchor_pic_flag ) { | | |
|     if( slice_type = = P \|\| slice_type = = B ) { | | |
|       for( compIdx = 0; compIdx < 2; compIdx++ ) | | |
|         global_disparity_mb_l0 [ compIdx ] | 2 | se(v) |
|     } | | |
|     if(( slice_type = = B ) { | | |
|       for( compIdx = 0; compIdx < 2; compIdx++ ) | | |
|         global_disparity_mb_l1 [ compIdx ] | 2 | se(v) |
|     } | | |
|     if( slice_type = = P \|\| slice_type = = B ) { | | |
|       arf_flag | 2 | u(1) |
|       if(arf_flag) { | | |
|         for (k = 0; k < =num_filters_l0_minus1; k++) { | | |
|         arf_l0_flag | 2 | u(1) |
|         if (arf_l0_flag) { | | |
|           for(j = 0; j < 4; j++) | | |
|             coeff_l0[k][j] | 2 | se(v) |
|         } | | |
|       } | | |
|       if(slice_type == B) { | | |
|         for (k = 0; k < =num_filters_l1_minus1; k++) { | | |
|         arf_l1_flag | 2 | u(1) |
|         if (arf_l1_flag) { | | |
|           for(i = 0; i < 4; i++) | | |
|             coeff_l1[k][i] | 2 | se(v) |
|         } | | |
|       } //if B_SLICE | | |
|     } //if arf_flag | | |
|   } //if slice_type | | |
| } //if anchor picture | | |
|   pic_parameter_set_id | 2 | ue(v) |
|   frame_num | 2 | u(v) |
|   ... | | |
| } | | |

Decoding Process
Adaptive Reference Filtering Process
  Inputs to this process include the following:
  mbPartIdx: the current partition given by the partition index
  subMbPartIdx: the sub-macroblock partition index
  predFlagL0 and predFlagL1: prediction list utilization flags
  predPartLXL: a (partWidth)×(partHeight) array of prediction luma samples (with LX being replaced by L0 or L1 depending on predFlagL0 and predFlagL1)
  Outputs of this process include the following:
  predPartL: a (partWidth)×(partHeight) array of prediction luma samples
Adaptive Reference Filtering Process
  Inputs to this process include the following:
  mbPartIdx: the current partition given by the partition index
  subMbPartIdx: the sub-macroblock partition index
  predFlagL0 and predFlagL1: prediction list utilization flags
  predPartLX$_L$: a (partWidth)×(partHeight) array of prediction luma samples (with LX being replaced by L0 or L1 depending on predFlagL0 and predFlagL1)
  filtCoeffsL0: a two-dimensional array including the filter coefficients for the current picture corresponding to LIST_0
  filtCoeffsL1: a two-dimensional array including the filter coefficients for the current picture corresponding to LIST_1
  Outputs of this process include the following:
  predPart$_L$: a (partWidth)×(partHeight) array of prediction luma samples
For macroblocks or partitions with predFlagL0 equal to 1 in P and SP slices, the following applies:
  If arf_flag is equal to 0, the default filtering process is invoked with the same inputs and outputs as the process described in subclause 8.4.2.3 of the MPEG-4 AVC Standard.
  Otherwise (arf_flag is equal to 1), the adaptive filtering process is invoked with the same inputs and outputs as the process described in subclause 8.4.2.3 of the MPEG-4 AVC Standard.
For macroblocks or partitions with predFlagL0 or predFlagL1 equal to 1 in B slices, the following applies:
  If arf_flag is equal to 0, the default filtering process is invoked with the same inputs and outputs as the process described in subclause 8.4.2.3 of the MPEG-4 AVC Standard.
  Otherwise, if arf_flag is equal to 1, the adaptive filtering process, for macroblocks or partitions with predFlagL0 or predFlagL1 equal to 1 with the same inputs and outputs as the process described in subclause 8.4.2.3 of the MPEG-4 AVC Standard.
Default Filtering Process
  Inputs to this process are the same as specified in subclause 8.4.2.3 of the MPEG-4 AVC Standard.
  Outputs of this process are the same as specified in subclause 8.4.2.3 of the MPEG-4 AVC Standard.

Moreover, the following applies:
  x set equal to 0 ... partWidth−1, and y set equal to 0 ... partHeight−1.
The prediction sample values are derived as follows:
  If predFlagL0 is equal to 1 and predFlagL1 is equal to 0; predPart$_L$[x, y]=predPartL0$_L$[x, y]
  Otherwise, if predFlagL0 is equal to 0 and predFlagL1 is equal to 1, predPart$_L$[x, y]=predPartL1$_L$[x, y]
  Otherwise (predFlagL0 and predFlagL1 are equal to 1), predPart$_L$[x, y]=(predPartL0$_L$[x, y]+predPartL1$_L$[x, y]+1)>>1.

Adaptive Filtering Process

Inputs to this process are the same as specified in subclause 8.4.2.3 of the MPEG-4 AVC Standard.

Outputs of this process are the same as specified in subclause 8.4.2.3 of the MPEG-4 AVC Standard.

Moreover, the following applies:
  x set equal to 0 ... partWidth−1, and y set equal to 0 ... partHeight−1.
The prediction sample values are derived as follows:
  If the predFlagL0 is equal to 1 and predFlagL1 is equal to 0, the final predicted sample values predPart$_L$[x, y] are derived as follows:

predPart$_L$[x,y]=Clip(((predPartL0$_L$[x−1][y−1]+
    predPartL0$_L$[x+1][y−1]+predPartL0$_L$[x−1][y+1]+
    predPartL0$_L$[x+1][y+1])*filtCoeffL0[refIdxL0]
    [0]+(predPartL0$_L$[x][y−1]+predPartL0$_L$[x]
    [y+1])*filtCoeffL0[refIdxL0][1]+(predPartL0$_L$
    [x−1][y]+predPartL0$_L$[x+1][y])*filtCoeffL0[re-
    fIdxL0][2]+predPartL0$_L$[x][y]*filtCoeffL0[re-
    fIdxL0][3]+(1<<7))>>8)

Otherwise, if the predFlagL0 is equal to 0 and predFlagL1 is equal to 1, the final predicted sample values predPartL[x, y] are derived as follows:

predPart$_L$[x,y]=Clip(((predPartL1$_L$[x−1][y−1]+
    predPartL1$_L$[x+1][y−1]+predPartL1$_L$[x−1][y+1]+
    predPartL1$_L$[x+1][y+1])*filtCoeffL1[refIdxL1]
    [0]+(predPartL1$_L$[x][y−1]+predPartL1$_L$[x]
    [y+1])*filtCoeffL1[refIdxL1][1]+(predPartL1$_L$
    [x−1][y]+predPartL1$_L$[x+1][y])*filtCoeffL1[re-
    fIdxL1][2]+predPartL1$_L$[x][y]*filtCoeffL1[re-
    fIdxL1][3]+(1<<7))>>8)

Otherwise (both predFlagL0 and predFlagL1 are equal to 1), the final predicted sample values predPartL[x, y] are derived as follows:

predPart$_L$[x,y]=(predPartL0$_L$[x,y]+predPartL1$_L$[x,y]+
    1)>1 where the predPartL0$_L$ and predPartL1$_L$ can be derived as follows:

predPartL0$_L$[x,y]=Clip(((predPartL0$_L$[x−1][y−1]+
    predPartL0$_L$[x+1][y−1]+predPartL0$_L$[x−1][y+1]+
    predPartL0$_L$[x+1][y+1])*filtCoeffL0[refIdxL0]
    [0]+(predPartL0$_L$[x][y−1]+predPartL0$_L$[x]
    [y+1])*filtCoeffL0[refIdxL0][1]+(predPartL0$_L$
    [x−1][y]+predPartL0$_L$[x+1][y])*filtCoeffL0[re-
    fIdxL0][2]+predPartL0$_L$[x][y]*filtCoeffL0[re-
    fIdxL0][3]+(1<<7))>>8)

predPartL1$_L$[x,y]=Clip(((predPartL1$_L$[x−1][y−1]+
    predPartL1$_L$[x+1][y−1]+predPartL1$_L$[x−1][y+1]+
    predPartL1$_L$[x+1][y+1])*filtCoeffL1[refIdxL1]
    [0]+(predPartL1$_L$[x][y−1]+predPartL1$_L$[x]
    [y+1])*filtCoeffL1[refIdxL1][1]+(predPartL1$_L$
    [x−1][y]+predPartL1$_L$[x+1][y])*filtCoeffL1[re-
    fIdxL1][2]+predPartL1$_L$[x][y]*filtCoeffL1[re-
    fIdxL1][3]+(1<<7))>>8)

It is to be noted that if a pixel is not present (out of picture boundary), then the pixel value is set to 0.

A description will now be given of some of the many attendant advantages/features of the present invention, some of which have been mentioned above. For example, one advantage/feature is an apparatus having an encoder for encoding a current picture as a bi-predictive picture. The encoder performs adaptive filtering of at least one reference picture to respectively obtain at least one filtered reference picture, and bi-predictively codes the current picture using the at least one filtered reference picture. The at least one reference picture is a picture wherein at least one sample thereof is used for inter-prediction either of subsequent to the least one sample being applied to an in-loop filter or in an absence of the at least one sample being applied to an in-loop filter. Reference filter coefficients for the adaptive filtering are determined responsive to at least one of luma values and chroma values of pixels grouped based on at least one of depth and disparity and motion.

Another advantage/feature is the apparatus having the encoder as described above, wherein the encoder estimates at least one set of filters for the adaptive filtering based on information from the current picture and two reference pictures. Each of the two reference pictures corresponds to a respective one of two reference lists. The two reference pictures include the at least one reference picture to be adaptively filtered to obtain the at least one filtered reference picture.

Yet another advantage/feature is the apparatus having the encoder that estimates at least one set of filters for the adaptive filtering based on information from the current picture and two reference pictures as described above, wherein the information from the current picture and the two reference pictures in the two reference lists includes at least one of three sets of information. The first set of information includes at least one prediction direction for different blocks within the current picture. The second set of information includes at least one of motion information and disparity information between the current picture and the two reference pictures in the two reference lists. The third set of information includes at least one of intensity information and color information between the current picture and the two reference picture in the two reference lists.

Still another advantage/feature is the apparatus having the encoder that estimates at least one set of filters for the adaptive filtering based on information from the current picture and two reference pictures as described above, wherein the encoder further determines a number of filters in each of the at least one set based on the information from the current picture and the two reference pictures in the two reference lists.

Moreover, another advantage/feature is the apparatus having the encoder as described above, wherein the adaptive filtering is used to generate at least one of integer pixels and sub-pixels in two filtered reference pictures corresponding to two reference lists. The two filtered reference pictures include the at least one filtered reference picture that is obtained from adaptively filtering the at least one reference picture.

Further, another advantage/feature is apparatus having the encoder as described above, wherein the encoder classifies blocks in the current picture based upon three classes. The blocks in the current picture classified in a first one of the three classes select reference pictures from a first reference list. Blocks in the current picture classified in a second one of the three classes select reference pictures from a second reference list. Blocks in the current picture classified in a third one of the three classes select an average predictor based on the reference pictures from both the first reference list and the second reference list.

Also, another advantage is the apparatus having the encoder that classifies blocks in the current picture based upon three classes as described above, wherein the encoder respectively estimates one of three sets of filters for each of the three classes. Each set consists of a single filter when picture-wise inter-view mismatches exist, and includes more than one filter when non-picture-wise inter-view mismatches exist.

Additionally, another advantage/feature is the apparatus having the encoder that classifies blocks in the current picture based upon three classes as described above, wherein at least one of the three classes is partitioned into multiple depth-levels based upon disparity information.

Moreover, another advantage/feature is the apparatus having the encoder that classifies blocks in the current picture based upon three classes as described above, wherein the encoder respectively estimates two sets of filters for the three classes. A first one of the two sets corresponds to the first one and the third one of the three classes. A second one of the two sets corresponds to the second one and the third one of the three classes. The first one of the two sets is estimated with respect to the first reference list. The second one of the two sets is estimated with respect to the second reference list.

Further, another advantage/feature is the apparatus having the encoder as described above, wherein the encoder performs an initial disparity estimation using only a single reference list from among two reference lists when only the single reference list includes mismatches with respect to the current picture, partitions the current picture into regions suffering from different types of mismatches, estimates at least one filter for each of the regions, and applies the at least one filter with respect to the single reference list used in the initial disparity estimation. The current picture is encoded as the bi-predictive picture using the single reference list having at least one filtered reference picture corresponding thereto and another reference list.

Also, another advantage/feature is the apparatus having the encoder as described above, wherein the encoder signals, using at least one high level syntax element, at least one of filters that are used for a first reference list, filters that are used for a second reference list, and filters that are used for both the first and the second reference lists.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. An apparatus, comprising:
an encoder (100) for encoding a current picture as a bi-predictive picture, wherein said encoder performs adaptive filtering of at least one reference picture to respectively obtain at least one filtered reference picture, and bi-predictively codes the current picture using the at least one filtered reference picture, the at least one reference picture being a picture wherein at least one sample thereof is used for inter-prediction either of subsequent to the least one sample being applied to an in-loop filter or in an absence of the at least one sample being applied to an in-loop filter, and wherein reference filter coefficients for the adaptive filtering are determined responsive to at least one of luma values and chroma values of pixels grouped based on at least one of depth and disparity and motion.

2. The apparatus of claim 1, wherein said encoder (100) estimates at least one set of filters for the adaptive filtering based on information from the current picture and two reference pictures, each of the two reference pictures corresponding to a respective one of two reference lists, the two reference pictures including the at least one reference picture to be adaptively filtered to obtain the at least one filtered reference picture.

3. The apparatus of claim 2, wherein the information from the current picture and the two reference pictures in the two reference lists comprises at least one of three sets of information, the first set of information comprising at least one prediction direction for different blocks within the current picture, the second set of information comprising at least one of motion information and disparity information between the current picture and the two reference pictures in the two reference lists, and the third set of information comprising at least one of intensity information and color information between the current picture and the two reference picture in the two reference lists.

4. The apparatus of claim 2, wherein said encoder (100) further determines a number of filters in each of the at least one set based on the information from the current picture and the two reference pictures in the two reference lists.

5. The apparatus of claim 1, wherein the adaptive filtering is used to generate at least one of integer pixels and sub-pixels in two filtered reference pictures corresponding to two reference lists, the two filtered reference pictures including the at least one filtered reference picture that is obtained from adaptively filtering the at least one reference picture.

6. The apparatus of claim 1, wherein said encoder (100) classifies blocks in the current picture based upon three classes, wherein the blocks in the current picture classified in a first one of the three classes select reference pictures from a first reference list, blocks in the current picture classified in a second one of the three classes select reference pictures from a second reference list, and blocks in the current picture classified in a third one of the three classes select an average predictor based on the reference pictures from both the first reference list and the second reference list.

7. The apparatus of claim 6, wherein said encoder (100) respectively estimates one of three sets of filters for each of the three classes, where each set consists of a single filter when picture-wise inter-view mismatches exist, and includes more than one filter when non-picture-wise inter-view mismatches exist.

8. The apparatus of claim 6, wherein at least one of the three classes is partitioned into multiple depth-levels based upon disparity information.

9. The apparatus of claim 6, wherein said encoder (100) respectively estimates two sets of filters for the three classes, where a first one of the two sets corresponds to the first one and the third one of the three classes, and a second one of the two sets corresponds to the second one and the third one of the three classes, the first one of the two sets being estimated with respect to the first reference list, and the second one of the two sets being estimated with respect to the second reference list.

10. The apparatus of claim 1, wherein said encoder (100) performs an initial disparity estimation using only a single reference list from among two reference lists when only the single reference list includes mismatches with respect to the current picture, partitions the current picture into regions suffering from different types of mismatches, estimates at least one filter for each of the regions, and applies the at least one filter with respect to the single reference list used in the initial disparity estimation, wherein the current picture is encoded as the bi-predictive picture using the single reference list having at least one filtered reference picture corresponding thereto and another reference list.

11. The apparatus of claim 1, wherein said encoder (100) signals, using at least one high level syntax element, at least one of filters that are used for a first reference list, filters that are used for a second reference list, and filters that are used for both the first and the second reference lists.

12. A method, comprising:
encoding a current picture as a bi-predictive picture, wherein said encoding step comprises performing adaptive filtering of at least one reference picture to respectively obtain at least one filtered reference picture, and bi-predictively coding the current picture using the at least one filtered reference picture, the at least one reference picture being a picture wherein at least one sample thereof is used for inter-prediction either of subsequent to the least one sample being applied to an in-loop filter or in an absence of the at least one sample being applied to an in-loop filter, and wherein reference filter coefficients for the adaptive filtering are determined responsive to at least one of luma values and chroma values of pixels grouped based on at least one of depth and disparity and motion (415, 420, 425).

13. The method of claim 12, wherein said encoding step comprises estimating at least one set of filters for the adaptive filtering based on information from the current picture and two reference pictures, each of the two reference pictures corresponding to a respective one of two reference lists, the two reference pictures including the at least one reference picture to be adaptively filtered to obtain the at least one filtered reference picture.

14. The method of claim 13, wherein the information from the current picture and the two reference pictures in the two reference lists comprises at least one of three sets of information, the first set of information comprising at least one prediction direction for different blocks within the current picture, the second set of information comprising at least one of motion information and disparity information between the current picture and the two reference pictures in the two reference lists, and the third set of information comprising at least one of intensity information and color information between the current picture and the two reference picture in the two reference lists (415).

15. The method of claim 13, wherein said encoding step further comprises determining a number of filters in each of the at least one set based on information from the current picture and the two reference pictures in the two reference lists (520, 530, 545, 620, 630, 645, 715, 725, 740).

16. The method of claim 12, wherein the adaptive filtering is used to generate at least one of integer pixels and sub-pixels in two filtered reference pictures corresponding to two reference lists, the two filtered reference pictures including the at least one filtered reference picture that is obtained from adaptively filtering the at least one reference picture.

17. The method of claim 12, wherein said encoding step comprises classifying blocks in the current picture based upon three classes, wherein the blocks in the current picture classified in a first one of the three classes select reference pictures from a first reference list, blocks in the current picture classified in a second one of the three classes select reference pictures from a second reference list, and blocks in the current picture classified in a third one of the three classes select an average predictor based on the reference pictures from both the first reference list and the second reference list (515, 615).

18. The method of claim 17, wherein said encoding step further comprises respectively estimating one of three sets of filters for each of the three classes, where each set consists of a single filter when picture-wise inter-view mismatches exist, and includes more than one filter when non-picture-wise inter-view mismatches exist (520, 535, 550).

19. The method of claim 17, wherein at least one of the three classes is partitioned into multiple depth-levels based upon disparity information (510, 610, 710).

20. The method of claim 17, wherein said encoding step further comprises respectively estimating two sets of filters for the three classes, where a first one of the two sets corresponds to the first one and the third one of the three classes, and a second one of the two sets corresponds to the second one and the third one of the three classes, the first one of the two sets being estimated with respect to the first reference list, and the second one of the two sets being estimated with respect to the second reference list (630, 650).

21. The method of claim 12, wherein said encoding step comprises:
performing an initial disparity estimation using only a single reference list when only the single reference list includes mismatches with respect to the current picture (710);
partitioning the current picture into regions suffering from different types of mismatches (720);
estimating at least one filter for each of the regions (725); and
applying the at least one filter to the single reference list used in the initial disparity estimation (730),
wherein the current picture is encoded as the bi-predictive picture using the single reference list having at least one filtered reference picture corresponding thereto and another reference list (735).

22. The method of claim 12, wherein said encoding step comprises signaling, using at least one high level syntax element, at least one of filters that are used for a first reference list, filters that are used for a second reference list, and filters that are used for both the first and the second reference lists (815).

* * * * *